US012294465B2

(12) United States Patent
Kuo et al.

(10) Patent No.: US 12,294,465 B2
(45) Date of Patent: May 6, 2025

(54) RESOURCE SELECTION FOR TRANSMISSION OF PENDING DATA UNIT

(71) Applicant: Nokia Technologies Oy, Espoo (FI)

(72) Inventors: Ping-Heng Kuo, London (GB); Chunli Wu, Beijing (CN); Dawid Koziol, Wroclaw (PL); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 335 days.

(21) Appl. No.: 17/754,164

(22) PCT Filed: Sep. 30, 2019

(86) PCT No.: PCT/CN2019/109613
§ 371 (c)(1),
(2) Date: Mar. 25, 2022

(87) PCT Pub. No.: WO2021/062713
PCT Pub. Date: Apr. 8, 2021

(65) Prior Publication Data
US 2022/0294576 A1    Sep. 15, 2022

(51) Int. Cl.
*H04L 1/1829* (2023.01)
*H04L 1/1812* (2023.01)
(Continued)

(52) U.S. Cl.
CPC .......... *H04L 1/1861* (2013.01); *H04L 1/1812* (2013.01); *H04L 1/1893* (2013.01); *H04W 72/56* (2023.01)

(58) Field of Classification Search
CPC ..... H04L 1/1861; H04L 1/1893; H04W 72/56
See application file for complete search history.

(56) References Cited

U.S. PATENT DOCUMENTS

| 2019/0150180 A1 | 5/2019 | Zou et al. |
| 2019/0190661 A1* | 6/2019 | You ................ H04W 74/0833 |
| 2024/0147493 A1* | 5/2024 | Yu ..................... H04W 72/232 |

FOREIGN PATENT DOCUMENTS

| CN | 108633097 A | 10/2018 |
| WO | 2018/113951 A1 | 6/2018 |
| WO | WO-2018128568 A1 * | 7/2018 ........... H04L 1/1812 |

OTHER PUBLICATIONS

Extended European Search Report received for corresponding European Patent Application No. 19947700.1, dated Mar. 6, 2023, 9 pages.

(Continued)

*Primary Examiner* — Michael A Keller
(74) *Attorney, Agent, or Firm* — Barta Jones, PLLC (57) ABSTRACT

Embodiments of the present disclosure relate to devices, methods, apparatuses and computer readable storage media of the resource selection for the transmission of a pending data unit. The method comprises in accordance with a determination that a data unit is not successfully transmitted using a resource associated with an original Hybrid Automatic Repeat Request, HARQ, process, determining a set of allowed HARQ processes for transmitting the data unit based on at least one condition; selecting a further resource associated with a target HARQ process from the set of allowed HARQ process and transmitting the data unit using the further resource to the second apparatus. In this way, a scheme for conditional HARQ switching is proposed, such that the pending MAC PDU could be retransmitted rapidly. Meanwhile, the retransmission of the pending MAC PDU may not influence other scheduled traffics.

18 Claims, 3 Drawing Sheets

(51) Int. Cl.
　　　*H04L 1/1867*　　　(2023.01)
　　　*H04W 72/56*　　　(2023.01)

(56)　　　　References Cited

OTHER PUBLICATIONS

"Handling of collisions with a CG", 3GPP TSG-RAN WG2 Meeting #107, R2-1911383, Agenda: 11.7.3, Sequans Communications, Aug. 26-30, 2019, 4 pages.
"Handling of De-prioritized MAC PDUs", 3GPP TSG-RAN WG2 Meeting #107, R2-1909499, Agenda: 11.7.3, Nokia, Aug. 26-30, 2019, 3 pages.
International Search Report and Written Opinion received for corresponding Patent Cooperation Treaty Application No. PCT/CN2019/109613, dated Jun. 30, 2020, 10 pages.
"Introduction of CPC for 1.28Mcps TDD", 3GPP TSG-WG2 Meeting #65, R2-091875, CATT, Feb. 9-13, 2009, 6 pages.
"Multiple HARQ procedures and intra-UE UCI prioritization", 3GPP TSG RAN WG1 Meeting #97, R1-1906566, Agenda: 7.2.6.2, MediaTek Inc, May 13-17, 2019, 11 pages.

\* cited by examiner

RESOURCE SELECTION FOR TRANSMISSION OF PENDING DATA UNIT

RELATED APPLICATION

This application claims priority to PCT Application No. PCT/CN2019/109613, filed on Sep. 30, 2019, each of which is incorporated herein by reference in its entirety.

FIELD

Embodiments of the present disclosure generally relate to the field of telecommunication and in particular, to devices, methods, apparatuses and computer readable storage media of the resource selection for the transmission of a pending data unit.

BACKGROUND

If a terminal device has two or more uplink grants with overlapping time resources, the terminal device may have some already-generated MAC Protocol Data Units (PDUs) that are eventually de-prioritized and hence not transmitted completely. Also, in New Radio Unlicensed (NR-U), there could be a similar situation where the generated PDU cannot be transmitted due to Listen Before Talk (LBT) failure.

The "generated but not transmitted" MAC PDU may be considered as Pending MAC PDU. For de-prioritized PUSCH on dynamic grant, such MAC PDU may be stored in a HARQ buffer and may allow a network device to schedule a retransmission resource associating to the same HARQ process, i.e. a HARQ process associated with the original grant scheduled for this MAC PDU. For de-prioritized PUSCH on configured grants, such MAC PDU may be stored in a HARQ buffer of the corresponding HARQ process, and may allow a network device to schedule a retransmission, or the terminal device may transmit this MAC PDU using the subsequent radio resources e.g. associated with the same HARQ process.

SUMMARY

In general, example embodiments of the present disclosure provide a solution of the resource selection for the transmission of a pending data unit.

In a first aspect, there is provided a first apparatus. The first apparatus comprises at least one processor; and at least one memory including computer program codes; the at least one memory and the computer program codes are configured to, with the at least one processor, cause the first apparatus at least to in accordance with a determination that a data unit is not successfully transmitted using a resource associated with an original Hybrid Automatic Repeat Request, HARQ, process, determine a set of allowed HARQ processes for transmitting the data unit based on at least one condition; select a further resource associated with a target HARQ process from the set of allowed HARQ process; and transmit the data unit using the further resource to the second apparatus.

In a second aspect, there is provided a second apparatus. The second apparatus comprises at least one processor; and at least one memory including computer program codes; the at least one memory and the computer program codes are configured to, with the at least one processor, cause the second apparatus at least to generate at least one condition, to cause a first apparatus to determine a set of allowed Hybrid Automatic Repeat Request, HARQ, processes for transmitting a data unit in the first apparatus being not successfully transmitted using a resource associated with an original HARQ process; and receive, from the first apparatus, the data unit on a further resource associated with a target HARQ process being selected by the first apparatus from the set of allowed HARQ processes.

In a third aspect, there is provided a method. The method comprises in accordance with a determination that a data unit is not successfully transmitted using a resource associated with an original Hybrid Automatic Repeat Request, HARQ, process, determining a set of allowed HARQ processes for transmitting the data unit based on at least one condition; selecting a further resource associated with a target HARQ process from the set of allowed HARQ process; and transmitting the data unit using the further resource to the second apparatus.

In a fourth aspect, there is provided a method. The method comprises generating, at a second apparatus, at least one condition, to cause a first apparatus to determine a set of allowed Hybrid Automatic Repeat Request, HARQ, processes for transmitting a data unit in the first apparatus being not successfully transmitted using a resource associated with an original HARQ process; and receiving, from the first apparatus, the data unit on a further resource associated with a target HARQ process being selected by the first apparatus from the set of allowed HARQ processes.

In a fifth aspect, there is provided an apparatus comprises means for in accordance with a determination that a data unit is not successfully transmitted using a resource associated with an original Hybrid Automatic Repeat Request, HARQ, process, determining a set of allowed HARQ processes for transmitting the data unit based on at least one condition; means for selecting a further resource associated with a target HARQ process from the set of allowed HARQ process; and means for transmitting the data unit using the further resource to the second apparatus.

In a sixth aspect, there is provided an apparatus comprises means for generating, at a second apparatus, at least one condition, to cause a first apparatus to determine a set of allowed Hybrid Automatic Repeat Request, HARQ, processes for transmitting a data unit in the first apparatus being not successfully transmitted using a resource associated with an original HARQ process; and means for receiving, from the first apparatus, the data unit on a further resource associated with a target HARQ process being selected by the first apparatus from the set of allowed HARQ processes.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 1:
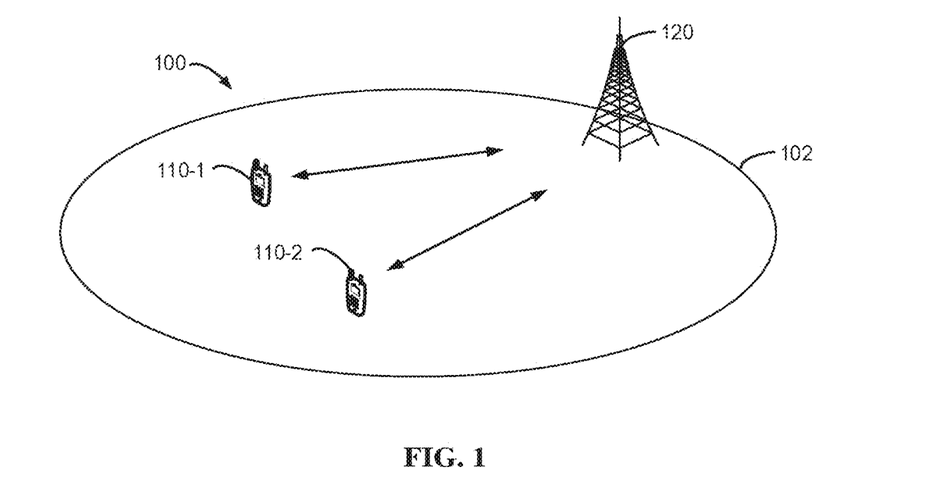
FIG. 1 shows an example communication network in which example embodiments of the present disclosure may be implemented.

FIG. 1 shows an example communication network 100 in which embodiments of the present disclosure can be implemented. The network 100 includes a second apparatus 120 (hereinafter may be referred as to a network device 120) and first apparatuses 110-1 and 110-2 (hereinafter collectively referred to as first apparatuses 110 or individually referred to as a terminal device 110) served by the network device 120. The serving area of the network device 120 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 120.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, if a terminal device has two or more uplink grants with overlapping time resources, the terminal device may have some already-generated MAC Protocol Data Units (PDUs) that are eventually de-prioritized and hence not transmitted completely. Also, in New Radio Unlicensed (NR-U), there could be a similar situation where the generated PDU cannot be transmitted due to Listen Before Talk (LBT) failure.

The "generated but not transmitted" MAC PDU may be considered as Pending MAC PDU. For de-prioritized PUSCH on dynamic grant, such MAC PDU may be stored in a HARQ buffer and may allow a network device to schedule a retransmission associating to the same HARQ process, i.e. a HARQ process associating to the original grant for this MAC PDU. For de-prioritized PUSCH on configured grants, such MAC PDU may be stored in a HARQ buffer and may allow a network device to schedule a retransmission, or the terminal device may transmit this MAC PDU using the subsequent radio resources e.g. associated with the same HARQ process.

Generally, the pending MAC PDUs should be buffered in the HARQ buffer of the associated HARQ process and may be handled by o relying on re-TX grants or an automatic transmission on subsequent resources with the same HARQ process.

Additionally, 3rd Generation Partnership Project (3GPP) is building support for NR to operate on unlicensed spectrum where the transmitter needs to perform CCA (Clear Channel Assessment)/LBT operation before accessing the channel. For such operation, terminal device may have built already a MAC PDU in the MAC layer which then fails CCA procedure at the L1.

If the pending MAC PDU was generated for a configured grant, the network device may not be aware if there is a MAC PDU generated for the configured grant occasion. The resource could have been skipped by the terminal device because no traffic in the logical channel buffer. Hence, it is inefficient to rely on re-Tx grants if the network device has to overprovision re-transmission resources for every configured grant occasion that potentially has pending MAC PDUs.

On the other hand, automatic retransmission on subsequent resource with the same HARQ process is rather restricted as such resource may not be immediately available as the HARQ process ID is calculated based on the SFN/subframe/symbol numbers. In NR-U where the HARQ process ID is indicated by the terminal device to the network the terminal device may allocate the HARQ process ID (for instance, if it was the only free one) to the next TB when the previous one failed transmission due to CCA/LBT.

To facilitate more rapid transmission of the pending MAC PDUs, it has been considered that the terminal device may automatically transmit the pending MAC PDUs on the subsequent resources with a HARQ process different from the original HARQ process if such resource is available. However, there are some issues that need to be addressed.

For example, if some MAC Control Element (CEs) already embedded in the de-prioritized MAC PDU, the network device could be confused with the reference timing of the information. If the subsequent resources are reserved for other traffics having higher priority, the retransmission of the pending MAC PDU may be blocked.

Furthermore, it is not guaranteed that the subsequent radio resource has appropriate parameters such as TBS for the pending MAC PDU. Also, the previous transmissions if any has been done already on the process are wasted, because as the network device cannot combine transmissions from different processes.

Therefore, the present disclosure proposes a solution of the resource selection for the transmission of a pending data unit. Some conditions may be configured for the terminal device to determine a set of allowed HARQ processes for the transmission of the pending MAC PDU, and the terminal device can therefore select a resource associated with a suitable HARQ process from a set of allowed HARQ processes to transmit the pending MAC PDU.

Figure 2:
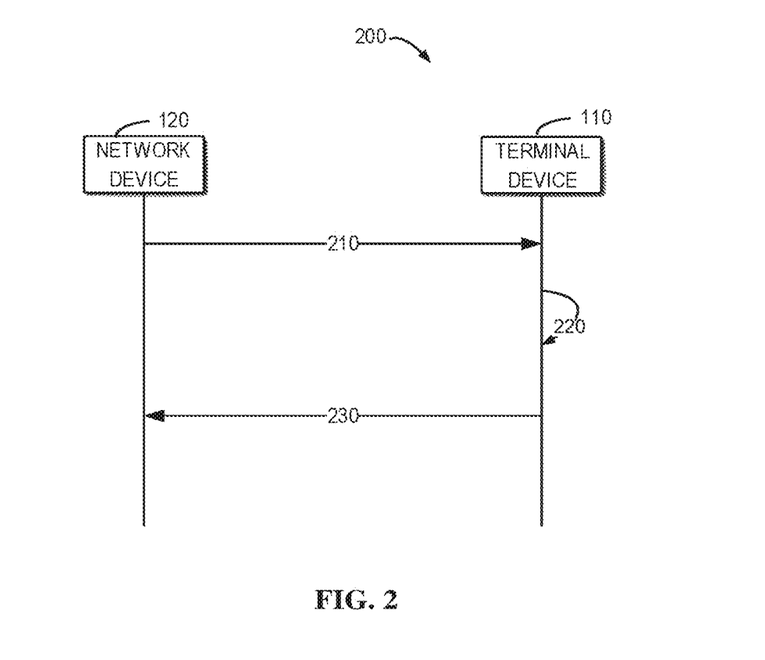
FIG. 2 shows a schematic diagram illustrating a process 200 of the resource selection for the transmission of a pending data unit according to example embodiments of the present disclosure.

Principle and implementations of the present disclosure will be described in detail below with reference to FIG. 2, which shows a schematic diagram of the resource selection for the transmission of a pending data unit. For the purpose of discussion, the process 200 will be described with reference to FIG. 1. The process 200 may involve the network device 120 and the terminal device 110 as illustrated in FIG. 1.

As mentioned above, it is possible that a pending MAC PDU has been generated in the terminal device 110 but is not successfully transmitted in an original HARQ process for this MAC PDU and the pending MAC PDU may be stored in this original HARQ process buffer. To determine which subsequent radio resource can be used for transmitting the pending MAC PDU, the terminal device 110 obtains 210 at least one condition for determining the allowed HARQ processes. For example, the at least one condition may be obtained from the network device 120 via a suitable signaling, for example, a RRC signaling.

In general, the one or more conditions may refer to the following aspect, namely, Logical Channel Priority (LCH) related conditions, grant-related conditions, queuing/delivery time related conditions, HARQ process-related conditions and Channel Access Priority Class (CAPC) related conditions.

Such conditions may indicate in which case a switching to a new HARQ process different from the original HARQ process can be performed and in which case the pending MAC PDU can only use the original HARQ. The conditions may include threshold value, threshold level, range and indicator for certain parameters associated with data properties of the MAC PDU, grant characters or the property of the original HARQ process.

For example, the terminal device 110 determines 220 a set of allowed HARQ processes for transmitting the MAC PDU based on the at least one condition, for example, by matching above-mentioned data properties of the MAC PDU, grant characters or the property of the original HARQ process with the obtained one or more conditions. The processing for selecting the target HARQ process will be described in detail in accordance with one or more conditions in above-mentioned aspect as below.

In some example embodiments, the condition may refer to LCH priority. The terminal device 110 may determine at least one threshold level for a LCH priority based on the condition. The terminal device 110 may determine the highest LCH priority of the data in the pending MAC PDU. The terminal device 110 may determine the set of allowed HARQ processes based on the comparison of the at least one threshold level and the highest LCH priority of the data.

In some example embodiments, if the terminal device 110 determines that the highest LCH priority of data in the pending MAC PDU exceeds the threshold level for LCH priority for HARQ process switching, the terminal device 110 may determine that the set of allowed HARQ processes comprise at least one candidate HARQ process different from the original HARQ. If the terminal device 110 determines that the highest LCH priority of data is lower the threshold level for LCH priority, the terminal device 110 may determine that the set of allowed HARQ process comprise the original HARQ process only.

As an option, the terminal device 110 may determine a plurality of threshold for LCH priority. For example, the plurality of threshold for LCH priority comprise a first threshold level and the second threshold level and the second threshold level is higher than the first threshold level.

If the highest LCH priority is lower than the first threshold level, the set of allowed HARQ process may comprise the original HARQ process only. If the highest LCH priority exceeds the first threshold level and is lower than the second threshold level, the terminal device 110 may determine that a first set of allowed HARQ processes comprise at least one candidate HARQ process different from the original HARQ. If the highest LCH priority exceeds the second threshold level, the terminal device 110 may determine that a second set of allowed HARQ processes comprise at least one candidate HARQ process different from the original HARQ. The second set of allowed HARQ processes may comprise all existing HARQ process and the first set of allowed HARQ processes may be a subset of first set of allowed HARQ processes. That is, depending on the highest LCH priority of data in the MAC PDU, it can be transmitted on resources with different range of HARQ processes.

Whether HARQ process switching for a pending MAC PDU is allowed may also depend on the Packet Data Convergence Protocol (PDCP) duplication status, e.g. activated/deactivated and number of active legs of the Data Radio Bearer (DRB) corresponding to the LCHs mapped to this MAC PDU.

In some example embodiments, the condition may refer to characteristics of the grants, which may be related a grant configured when the MAC PDU is generated, or the later grant to be considered. The characteristics of the grants may be referred to as certain grant parameters. For example, the parameters may include Modulation and Coding Scheme (MCS), Transport Block Size (TBS) and repetitions, etc.

For example, the terminal device 110 may determine a threshold value for at least one characteristic parameter associated with a reference grant configuration and an actual value of the at least one characteristic parameter of a grant which has been configured for the data unit. The terminal device 120 may determine the set of allowed HARQ process based on a comparison between the threshold value and actual value.

In some example embodiments, the terminal device 110 determines the set of allowed HARQ process comprise at least one candidate HARQ process different from the original HARQ if the actual value exceeds the threshold value.

For example, characteristics of the grants may also refer to an indicator of the grant which has been configured for the data unit. For example, characteristics of the grants may refer to an indicator of this grant can be used for automatic re-transmission, or an indicator of the de-prioritized MAC PDU generated for this grant could be re-transmitted on a different HARQ process, etc. The terminal device 120 may determine the set of allowed HARQ process based on the indicator.

In some example embodiments, the condition may refer to certain timing criterion related to the data unit.

As an option, depends on how long the data unit has been queuing, different sets of allowed HARQ processes can be determined. (controlled by e.g. a timer). For instance, the pending MAC PDU may begin to use other HARQ processes after a certain timer expires.

In this case, the condition may refer to a threshold data unit queuing time interval. The terminal device 110 may determine how long the data unit has been queuing and determine the set of allowed HARQ process based on the comparison between the threshold data unit queuing time interval and the time duration that the data unit has been queuing.

For example, if the time duration of data has been queued exceeds the threshold data queuing time interval, the terminal device 110 determines the set of allowed HARQ process comprise at least one candidate HARQ process different from the original HARQ.

As another option, depends on how much time left to the delivery deadline of the data, different sets of allowed HARQ processes can be determined.

For example, the condition may refer to a threshold remaining time budget for data delivery. The terminal device 110 may determine how much time left to the delivery deadline of the data and determine the set of allowed HARQ process based on the comparison between the a threshold remaining time budget for data and the remaining time interval for delivering the data unit.

If the remaining time interval for delivering the data unit becomes shorter than the threshold remaining time budget for data delivery, the terminal device 110 determines the set of allowed HARQ process comprise at least one candidate HARQ process different from the original HARQ.

As another option, the determination of the set of allowed HARQ processes may be based on the number of attempts for transmitting the data unit. For example, the terminal device 110 may determine a threshold number of attempts for transmitting the data unit and determine the set of allowed HARQ process based on the comparison between the threshold number and an actual number of attempts for transmitting the data unit.

If the actual number of attempts for transmitting the data unit exceeds the threshold number, the terminal device 110 determines the set of allowed HARQ process comprise at least one candidate HARQ process different from the original HARQ.

The threshold number of attempts for transmitting the data unit may be set to zero, which means the MAC PDU has never been transmitted over the air.

In some example embodiments, the condition may refer to the grant configuration. The network device 120 may pre-configure a restrictive subset of HARQ process that can be used for automatic re-transmission. That is, the terminal device 110 cannot use resource with HARQ process outside this subset of automatic re-transmission.

If the de-prioritized MAC PDU was supposed to be carried over a Configured Grant (CG), this subset may be the same as the subset of HARQ processes configured for this CG configuration. The subset may be equal to the HARQ processes which are not configured for any of the Configured Grant configurations.

In this case, for example, the terminal device 110 may determine whether the transmission of data was scheduled based a configured grant. If so, the terminal device 110 may determines the set of allowed HARQ process comprise at least one candidate HARQ process different from the original HARQ.

As an option, the terminal device 110 may also determine association of original HARQ process and corresponding HARQ process. For example, the network device 120 may pre-configure certain associations between the original HARQ process of the de-prioritized MAC PDU and the HARQ process of subsequent resources that can be considered. For instance, if the de-prioritized MAC PDU was originally scheduled in HARQ process 1, then it can only be re-transmitted in resources with HARQ process 1 and 2; if the de-prioritized MAC PDU was originally in HARQ process 2, then it can only be re-transmitted in resources with HARQ process 2 and 4.

Furthermore, the determination of the set of allowed HARQ processes may also be depend on whether a buffer of the HARQ process to be used for de-prioritized MAC PDU transmission is empty, which means there is no other MAC PDU delivered to this HARQ process. Therefore, the HARQ process having an empty buffer may be used for the pending MAC PDU.

In some example embodiments, the condition may refer to the CAPC value of the pending MAC PDU, which is similar with the LCH priority case.

The terminal device 110 may determine at least one threshold level for a CAPC based on the condition. The terminal device 110 may determine the highest CAPC of the pending MAC PDU. The terminal device 110 may determine the set of allowed HARQ processes based on the comparison of the at least one threshold level and the highest CAPC of the pending MAC PDU.

In some example embodiments, if the terminal device 110 determines that the CAPC of the pending MAC PDU exceeds the threshold level for CAPC for HARQ process switching, the terminal device 110 may determine that the set of allowed HARQ processes comprise at least one candidate HARQ process different from the original HARQ. If the terminal device 110 determines that the CAPC of the MAC PDU is lower the threshold CAPC, the terminal device 110 may determine that the set of allowed HARQ process comprise the original HARQ process only.

As an option, the terminal device 110 may determine a plurality of threshold for CAPC. For example, the plurality of threshold for CAPC comprise a first threshold level and the second threshold level and the second threshold level is higher than the first threshold level.

If the CAPC of the pending MAC PDU is lower than the first threshold level, the set of allowed HARQ process may comprise the original HARQ process only. If the CAPC of the pending MAC PDU exceeds the first threshold level and is lower than the second threshold level, the terminal device 110 may determine that a first set of allowed HARQ processes comprise at least one candidate HARQ process different from the original HARQ. If the CAPC of the pending MAC PDU exceeds the second threshold level, the terminal device 110 may determine that a second set of allowed HARQ processes comprise at least one candidate HARQ process different from the original HARQ. The second set of allowed HARQ processes may comprise all existing HARQ process and the first set of allowed HARQ processes may be a subset of first set of allowed HARQ processes. That is, depending on the of the pending MAC PDU, it can be transmitted on resources with different range of HARQ processes.

In addition, upon switching the HARQ process, the transmission is considered as new transmission on the new HARQ process. The ConfiguredGrantTimer of the original HARQ process is stopped, in other words the original HARQ process is freed for new transmission.

The number of HARQ process switching, i.e. transmitting the pending MAC PDU using a resource associated with a new HARQ process other than the original one, performing by the terminal device may also be specified or be configurable by the Network. As an option, the maximal number of HARQ process switching may be the maximum number of re-transmission attempts for a MAC PDU if such is configured.

In some example embodiments, if the terminal device 110 determines the set of allowed HARQ processes based on a plurality of conditions as mentioned above, the terminal device 110 may determine priorities of the plurality of conditions and select the target HARQ process based on the priorities.

Specifically, if the terminal device 110 is configured with more than one condition that allows the terminal device 110 to switch HARQ process for a pending MAC PDU. Since it is difficult to meet all conditions for the terminal device 110 to perform HARQ process switching, a "priority level" or "importance level" may be assigned to each of the configured condition, some of conditions may be dropped based on an order determined by the priority level as time goes by. Thus, the probability of using a different HARQ process increases with the amount of time that such MAC PDU has been pending, so it can be transmitted more quickly in the due course. One implementation is that, each of the configured condition is associated with a timer (with different timer periods), and all timers start when the MAC PDU is generated. Upon the expiration of a timer, the corresponding condition of using a different HARQ process for the pending MAC PDU is dropped by the terminal device 110. That is, a "less important" criterion is typically associated to a shorter timer period.

Since the set of allowed HARQ process is determined, the terminal device 110 selects a resource, for example the next transmission occasion, associated with a target HARQ process from the set of allowed process. Then the terminal device 110 transmit the pending MAC PDU using the resource associated with a target HARQ process to the network device 120.

Here a new timer may be introduced for indicating the validity of the data, which may be referred to as "relevance timer" for MAC PDUs containing a certain LCH. While the timer is running, the MAC PDU can be transmitted using the same or different HARQ process. Once the timer expires, the terminal device 110 may discard the MAC PDU, for example by flushing the buffer of the HARQ process at which the MAC PDU is stored. The timer can either be an explicit value configured in the terminal device 110 or could be derived based on the value configured by the network and the MAC PDUs queuing time in a following way: $T_{relevance} = T_{configured} - T_{queueing}$.

As an option, the timer may be started when a transmission using a resource associated with the original HARQ process is initiated. As another option, the timer may be started when the pending MAC PDU is generated or stored in the HARQ buffer. In this case, in some example embodiments, the pending MAC PDU is transmitted if the timer for indicating a validity of the data does not expire.

In some example embodiments, although the resource for transmitting the pending MAC PDU is selected from the set of allowed HARQ process, the selected resource may be reserved for other traffic. In this case, the terminal device 110 may compare a priority of the data unit and a priority of the reserved traffic, i.e. a further data unit, the terminal device 110 may transmit the pending data unit if the data unit has a higher priority than that of the reserved traffic.

In case a single MAC PDU contains MAC SDUs with traffic from different LCHs the terminal device may start a timer which has the highest values from the timers configured for particular LCHs which are included in the MAC PDU. In this way, the MAC PDU is discarded only in case all the data carried by the MAC PDU is outdated. In case at least one of the contained LCHs does not have a timer configured, the terminal device may not start the timer meaning that the MAC PDU would not be discarded based on relevance timer. In some example embodiments, the relevance timer may be configured not as part of LCH configuration, but as part of Configured Grant configuration and therefore be the same regardless of which LCH is carried by the grant. In this case, a separate timer could be configured by the network device for dynamic grants, i.e. applied to all the dynamic grants regardless of which LCHs are carried by the grant.

Furthermore, a new Uplink Control Information (UCI) could be introduced and potentially multiplexed into the "new" PUSCH, which tells the network device to "ignore" or "consider" the timing of MAC CEs, as they could be generated much earlier and may not correctly reflect to the PUSCH timing. For intra-UE prioritization, it may also happen that a MAC PDU of the de-prioritized grant is not generated, because the prioritization takes place beforehand. After not having received the transmission related to a grant, a network device may schedule a retransmission grant, which will be used by the terminal device to send the previously de-prioritized data. In this case the MAC CEs included in the MAC PDU will again have timing differences from the one expected by the network device as the MAC PDU will be generated at the time of reception of a retransmission grant and not during the reception of the original grant. Hence, the network device may again interpret the timing of the MAC CEs wrongly. This could be covered either by the similar indication in UCI as proposed above or alternatively, in this case, the terminal device may include a MAC CE in the MAC PDU which will be sent over the retransmission grant, in order to notify the network device that the re-TX grant is used by the terminal device for new transmission. Hence, the network device will not be confused about the reference timing of the MAC CE information in the MAC PDUs to be generated for the re-TX grants.

In this way, a scheme for resource selection for the transmission of a pending data unit is proposed, such that the pending MAC PDU could be transmitted rapidly. Meanwhile, the transmission of the pending MAC PDU may not influence other scheduled traffics.

Figure 3:
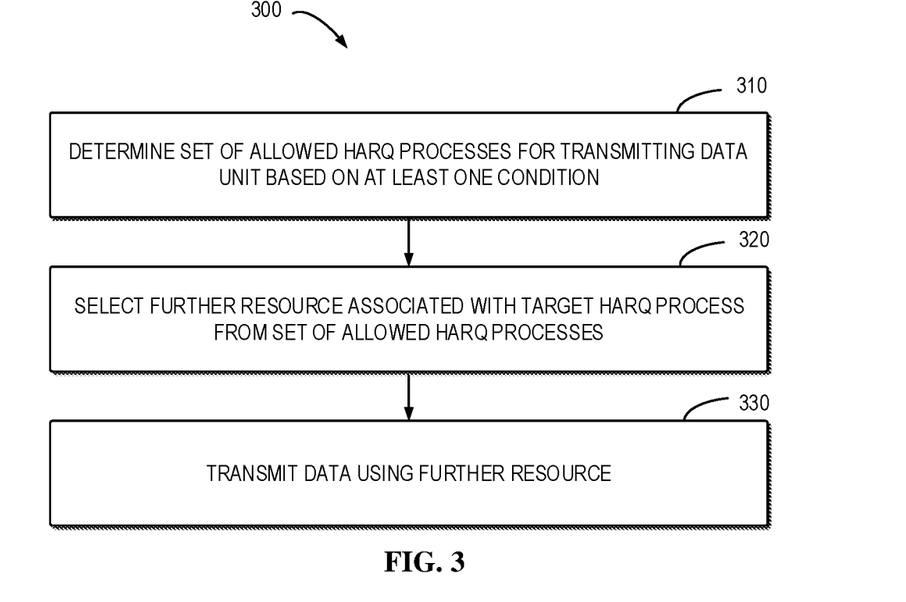
FIG. 3 shows a flowchart of an example method 300 of the resource selection for the transmission of a pending data unit according to some example embodiments of the present disclosure.

FIG. 3 shows a flowchart of an example method 300 of the resource selection for the transmission of a pending data unit. According to some example embodiments of the present disclosure. The method 300 can be implemented at the first apparatus 110 as shown in FIG. 1. For the purpose of discussion, the method 300 will be described with reference to FIG. 1.

As shown in FIG. 3, at 310, the first apparatus 110 determines a set of allowed HARQ processes for transmitting a data unit based on at least one condition, if the data unit is not successfully transmitted using a resource associated with an original HARQ process.

In some example embodiments, determining the set of allowed HARQ processes based on the at least one condition comprises: determining at least one threshold level of a logical channel priority; determining a level of a logical channel priority of data in the data unit; and determining the set of allowed HARQ processes based on a comparison between the level of the logical channel priority of the data and the at least one threshold level.

In some example embodiments, the first apparatus 110 may determine that the set of allowed HARQ processes comprise at least one candidate HARQ process different from the original HARQ if the level of the logical channel priority of the data exceeds the at least one threshold level and determines that the set of allowed HARQ process comprise the original HARQ process only if the level of the logical channel priority of the data is lower than the threshold level.

In some example embodiments, the at least one threshold level comprises a first threshold level and the second threshold level and the second threshold level is lower than the first threshold level, the first apparatus 110 may determine that a first set of allowed HARQ processes comprise at least one candidate HARQ process different from the original HARQ if the level of the logical channel priority of the data exceeds than the first threshold level, determine that a second set of allowed HARQ processes comprise at least one candidate HARQ process different from the original HARQ if the level of the logical channel priority of the data is lower than the first threshold level and exceeds the second threshold level, the second set being a subset of the first set. The first apparatus 110 may further determine that the set of allowed HARQ processes comprise the original HARQ process only, if the level of the logical channel priority of the data is lower than the second threshold level.

In some example embodiments, determining the set of allowed HARQ processes based on the at least one condition comprises determining a threshold value for at least one characteristic parameter associated with a reference grant configuration; determining an actual value of the at least one characteristic parameter of a target grant which has been configured for the data unit; and determining the set of allowed HARQ process based on a comparison between the threshold value and actual value.

In some example embodiments, determining the set of allowed HARQ processes based on the at least one condition comprises determining an indication of retransmission resources associated with a grant which has been configured for the data unit; and determining the set of allowed HARQ processes based on the indication.

In some example embodiments, determining the set of allowed HARQ processes based on the at least one condition comprises determining a threshold data unit queuing time interval; determining a first time duration that the data unit has been queued; and determining the set of allowed HARQ process based on a comparison between the first time duration that the data unit has been queued and the threshold data unit queuing time interval.

In some example embodiments, determining the set of allowed HARQ processes based the at least one condition comprises: determining a threshold remaining time budget for data delivery; determining a remaining time interval for delivering the data unit; and determining the set of allowed HARQ process based on a comparison between the remaining time interval for delivering the data unit and the threshold remaining time budget for data delivery.

In some example embodiments, determining the set of allowed HARQ processes based the at least one condition comprises: determining a threshold number of attempts for transmitting the data unit; and in accordance with a determination that an actual number of attempts for transmitting the data unit exceeds the threshold number of attempts, determining that the set of allowed HARQ processes comprise at least one candidate HARQ process different from the original HARQ.

In some example embodiments, the threshold number of attempts is zero.

In some example embodiments, determining the set of allowed HARQ processes based the at least one condition comprises: determining whether the transmission of data unit was scheduled based a configured grant; in accordance with a determination that the transmission of data unit was scheduled based the configured grant, determining that the set of allowed HARQ processes comprise at least one candidate HARQ process different from the original HARQ.

In some example embodiments, determining the set of allowed HARQ processes based on the at least one condition comprises: determining at least one threshold level of a channel access priority class; determining a level of a channel access priority class of data in the data unit; and determining the set of allowed HARQ processes based on a comparison between the level of the channel access priority class of the data unit and the at least one threshold level.

In some example embodiments, the first apparatus 110 may determine that the set of allowed HARQ processes comprise at least one candidate HARQ process different from the original HARQ if the level of the channel access priority class of the data unit exceeds the at least one threshold level and determines that the set of allowed HARQ process comprise the original HARQ process only if the level of the channel access priority class of the data unit is lower than the threshold level.

In some example embodiments, the at least one threshold level comprises a first threshold level and the second threshold level and the second threshold level is lower than the first threshold level, the first apparatus 110 may determine that a first set of allowed HARQ processes comprise at least one candidate HARQ process different from the original HARQ if the level of the channel access priority class of the data unit exceeds than the first threshold level, determine that a second set of allowed HARQ processes comprise at least one candidate HARQ process different from the original HARQ if the level of the channel access priority class of the data unit is lower than the first threshold level and exceeds the second threshold level, the second set being a subset of the first set. The first apparatus 110 may further determine that the set of allowed HARQ processes comprise the original HARQ process only, if the level of the channel access priority class of the data unit is lower than the second threshold level.

In some example embodiments, the at least one indication comprises a plurality of conditions, determining the set of allowed HARQ processes based on the at least one condition comprises: determining a priority of the plurality of conditions; and determining the set of allowed HARQ processes based on the priority of the plurality of conditions.

At 320, the first apparatus 110 selects a further resource associated with a target HARQ process from the set of allowed HARQ process. At 330, the first apparatus 110 transmits the data unit using the further resource to the second apparatus.

In some example embodiments, transmitting the data unit comprises if the first apparatus 110 determines that the further resource has been reserved for a further data unit, comparing a first priority of the data unit and a second priority of the further data unit, the first apparatus 110 compares a first priority of the data unit and a second priority of the further data unit. The first apparatus 110 transmits the data unit using the further resource if the first apparatus 110 determines that that first priority exceeds the second priority based on the comparison.

In some example embodiments, transmitting the data unit comprises transmitting the data unit in accordance with a determination that a timer for indicating a validity of the data unit does not expire.

In some example embodiments, the timer is started based on an initiation of a transmission using the resource associated with the original HARQ process or a generation of the data unit.

In some example embodiments, the first apparatus 110 may further generate an indicator for a transmission of the data unit using the further resource associated with the target HARQ process, the indicator including an indication of a validity of the control information embedded in the data unit and transmit the indicator to the second apparatus.

Figure 4:
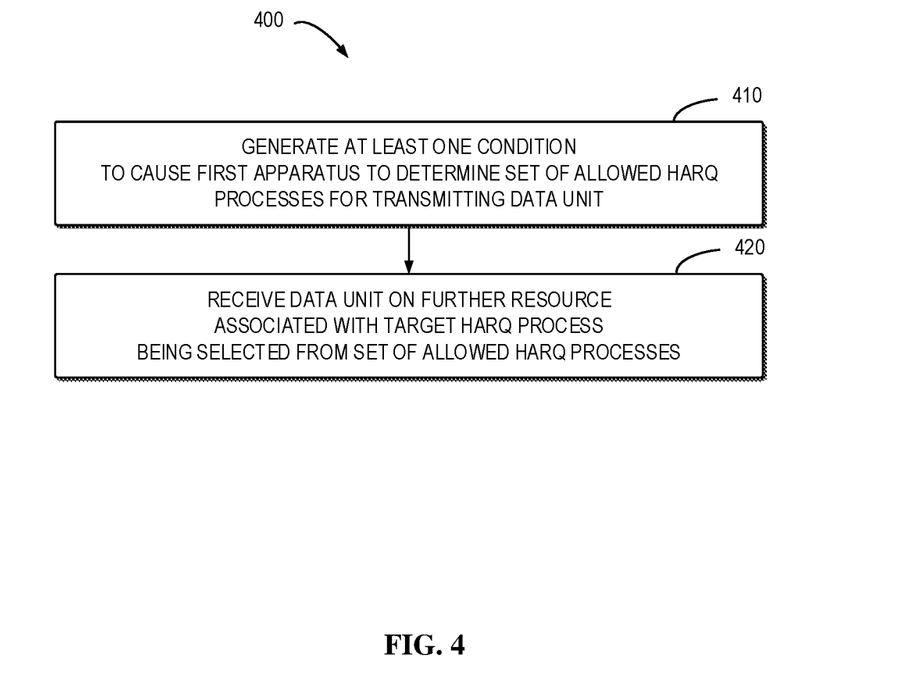
FIG. 4 shows a flowchart of an example method 400 of the resource selection for the transmission of a pending data unit according to some example embodiments of the present disclosure.

FIG. 4 shows a flowchart of an example method 400 of the resource selection for the transmission of a pending data unit according to some example embodiments of the present disclosure. The method 400 can be implemented at the second apparatus 120 as shown in FIG. 1. For the purpose of discussion, the method 400 will be described with reference to FIG. 1.

As shown in FIG. 4, at 410, the second apparatus 120 generates at least one condition, to cause a first apparatus to determine a set of allowed HARQ processes for transmitting a data unit in the first apparatus being not successfully transmitted using a resource associated with an original HARQ process.

In some example embodiments, at least one condition comprises at least one threshold level of a logical channel priority, such that the set of allowed HARQ processes is determined based on a comparison between a level of the logical channel priority of the data and the at least one threshold level.

In some example embodiments, at least one condition comprises a threshold value for at least one characteristic parameter associated with a reference grant configuration, such that the set of allowed HARQ processes is determined based on a comparison between the threshold value and an actual value of the at least one characteristic parameter of a target grant which has been configured for the data unit.

In some example embodiments, at least one condition comprises at least one condition comprises an indication of retransmission resources associated with a grant which has been configured for the data unit, such that the set of allowed HARQ processes is determined based on the indication.

In some example embodiments, at least one condition comprises at least one condition comprises a threshold data unit queuing time interval, such that the set of allowed HARQ processes is determined based on a comparison between the first time duration that the data unit has been queued and the threshold data unit queuing time interval.

In some example embodiments, at least one condition comprises at least one condition comprises a threshold remaining time budget for data delivery, such that the set of allowed HARQ processes is determined based on a comparison between the remaining time interval for delivering the data unit and the threshold remaining time budget for data delivery.

In some example embodiments, at least one condition comprises at least one condition comprises a threshold number of attempts for transmitting the data unit, such that the set of allowed HARQ processes comprise at least one candidate HARQ process different from the original HARQ is determined in accordance with a determination that an actual number of attempts for transmitting the data unit exceeds the threshold number of attempts.

In some example embodiments, at least one condition comprises at least one condition comprises an indication for determining the set of allowed HARQ processes based on a scheduled grant type for the transmission of data unit, such that the set of allowed HARQ processes comprise at least one candidate HARQ process different from the original HARQ is determined in accordance with a determination that a determination that the transmission of data unit was scheduled based the configured grant.

In some example embodiments, at least one condition comprises at least one threshold level of a channel access priority class, such that the set of allowed HARQ processes is determined based on a comparison between a level of the channel access priority class of the data unit and the at least one threshold level.

At 420, the second apparatus 120 receives the data unit on a further resource associated with a target HARQ process being selected by the first apparatus from the set of allowed HARQ processes from the first apparatus.

In some example embodiments, if the target HARQ process is different from the original HARQ process, the second apparatus 120 receives an indicator for a transmission of the data unit using the further resource associated with the target HARQ process, the indicator including an indication of a validity of the control information embedded in the data unit from the first apparatus and determines a validity of the control information based on the indicator.

In some example embodiments, the second apparatus 120 may further determine a reference value for a timer for indicating a validity of the data unit in the first apparatus and provide the reference value to the first apparatus.

In some example embodiments, an apparatus capable of performing the method 300 (for example, implemented at the first apparatus 110) may comprise means for performing the respective steps of the method 300. The means may be implemented in any suitable form. For example, the means may be implemented in a circuitry or software module.

In some example embodiments, the apparatus comprises means for in accordance with a determination that a data unit is not successfully transmitted using a resource associated with an original Hybrid Automatic Repeat Request, HARQ, process, determining a set of allowed HARQ processes for transmitting the data unit based on at least one condition; means for selecting a further resource associated with a target HARQ process from the set of allowed HARQ process; and means for transmitting the data unit using the further resource to the second apparatus.

In some example embodiments, an apparatus capable of performing the method 400 (for example, implemented at the second apparatus 120) may comprise means for performing the respective steps of the method 400. The means may be implemented in any suitable form. For example, the means may be implemented in a circuitry or software module.

In some example embodiments, the apparatus comprises means for generating, at a second apparatus, at least one condition, to cause a first apparatus to determine a set of allowed Hybrid Automatic Repeat Request, HARQ, processes for transmitting a data unit in the first apparatus being not successfully transmitted using a resource associated with an original HARQ process; and means for receiving, from the first apparatus, the data unit on a further resource associated with a target HARQ process being selected by the first apparatus from the set of allowed HARQ processes.

Figure 5:
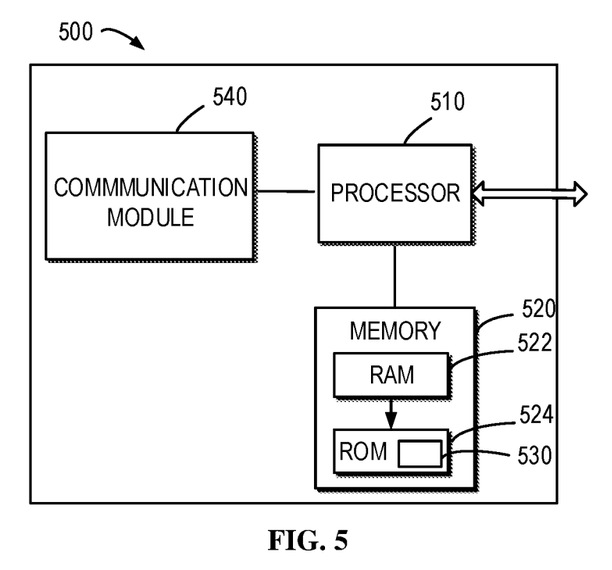
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the terminal device 110 and the network device 120 as shown in FIG. 1. As shown, the device 500 includes one or more processors 510, one or more memories 540 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

Figure 6:
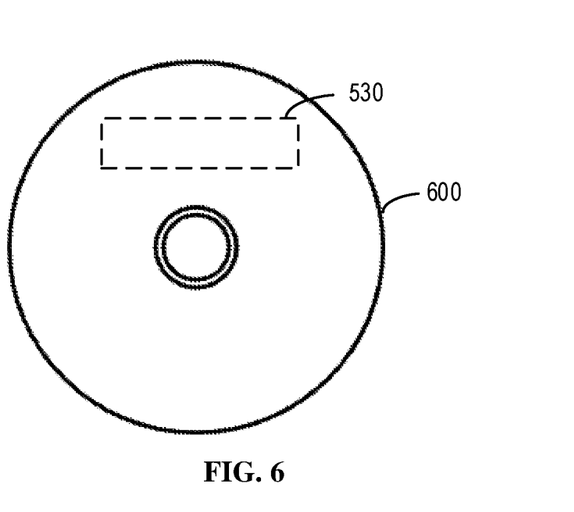
FIG. 6 shows a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:
at least one processor; and
at least one memory including computer program codes;
the at least one memory and the computer program codes are configured to, with the at least one processor, cause the first apparatus at least to:
in accordance with a determination that a data unit is not successfully transmitted using a resource associated with an original Hybrid Automatic Repeat Request, HARQ, process, determine a set of allowed HARQ processes for transmitting the data unit based on at least one condition,
wherein the first apparatus is caused to determine the set of allowed HARQ processes based on the at least one condition by:
determining at least one threshold level of a logical channel priority;
determining a level of a logical channel priority of data in the data unit; and
determining the set of allowed HARQ processes based on a comparison between the level of the logical channel priority of the data and the at least one threshold level;
select a further resource associated with a target HARQ process from the set of allowed HARQ processes; and
transmit the data unit using the further resource to a second apparatus.

2. The first apparatus of claim 1, wherein the first apparatus is caused to transmit the data unit by:
in accordance with a determination that the further resource has been reserved for a further data unit, comparing a first priority of the data unit and a second priority of the further data unit; and in accordance with a determination that first priority exceeds the second priority based on the comparison, transmitting the data unit using the further resource.

3. The first apparatus of claim 1, wherein the set of allowed HARQ processes comprise the original HARQ process only.

4. The first apparatus of claim 1, wherein the first apparatus is further caused to:
in accordance with a determination that the level of the logical channel priority of the data exceeds the at least one threshold level, determine that the set of allowed HARQ processes comprise at least one candidate HARQ process different from the original HARQ; and
in accordance with a determination that the level of the logical channel priority of the data is lower than the threshold level, determine that the set of allowed HARQ processes comprise the original HARQ process only.

5. The first apparatus of claim 1, wherein the at least one threshold level comprises a first threshold level and a second threshold level, the second threshold level being lower than the first threshold level, wherein the first apparatus is further caused to:
in accordance with a determination that the level of the logical channel priority of the data exceeds the first threshold level, determine that a first set of allowed HARQ processes comprise at least one candidate HARQ process different from the original HARQ;
in accordance with a determination that the level of the logical channel priority of the data is lower than the first threshold level and exceeds the second threshold level, determine that a second set of allowed HARQ processes comprise at least one candidate HARQ process different from the original HARQ, the second set being a subset of the first set; and
in accordance with a determination that the level of the logical channel priority of the data is lower than the second threshold level, determine that the set of allowed HARQ processes comprise the original HARQ process only.

6. The first apparatus of claim 1, wherein the first apparatus is caused to determine the set of allowed HARQ processes based on the at least one condition by at least one of:
determining a threshold value for at least one characteristic parameter associated with a reference grant configuration; determining an actual value of the at least one characteristic parameter of a grant which has been configured for the data unit; and determining the set of allowed HARQ processes based on a comparison between the threshold value and actual value; or
determining an indication associated with a grant which has been configured for the data unit; and determining the set of allowed HARQ processes based on the indication; or
determining a threshold data unit queuing time interval; determining a first time duration that the data unit has been queued; and determining the set of allowed HARQ processes based on a comparison between the first time duration that the data unit has been queued and the threshold data unit queuing time interval; or
determining a threshold remaining time budget for data delivery; determining a remaining time interval for delivering the data unit; and determining the set of allowed HARQ processes based on a comparison between the remaining time interval for delivering the data unit and the threshold remaining time budget for data delivery; or
determining a threshold number of attempts for transmitting the data unit; and in accordance with a determination that an actual number of attempts for transmitting the data unit exceeds the threshold number of attempts, determining that the set of allowed HARQ processes comprise at least one candidate HARQ process different from the original HARQ; or
determining whether transmission of the data unit was scheduled based on a configured grant; and in accordance with a determination that the transmission of data unit was scheduled based on the configured grant, determining that the set of allowed HARQ processes comprise at least one candidate HARQ process different from the original HARQ associated with resources of the same configured grant configuration; or
determining at least one threshold level of a channel access priority class; determining a level of the channel access priority class of the data unit; and determining the set of allowed HARQ processes based on a comparison between the level of the channel access priority class of the data unit and the at least one threshold level.

7. The first apparatus of claim 6, wherein the threshold number of attempts is zero.

8. The first apparatus of claim 6, wherein the first apparatus is further caused to:
in accordance with a determination that the level of the channel access priority class of the data unit exceeds the at least one threshold level, determine that the set of allowed HARQ processes comprise at least one candidate HARQ process different from the original HARQ; and
in accordance with a determination that the level of the channel access priority class of the data unit is lower than the threshold level, determine that the set of allowed HARQ processes comprise the original HARQ process only.

9. The first apparatus of claim 6, wherein the at least one threshold level comprises a first threshold level and a second threshold level and the second threshold level is lower than the first threshold level, wherein the first apparatus is further caused to:
in accordance with a determination that the level of the channel access priority class of the data unit exceeds than the first threshold level, determine that a first set of allowed HARQ processes comprise at least one candidate HARQ process different from the original HARQ;
in accordance with a determination that the level of the channel access priority class of the data unit is lower than the first threshold level and exceeds the second threshold level, determine that a second set of allowed HARQ processes comprise at least one candidate HARQ process different from the original HARQ, the second set being a subset of the first set; and
in accordance with a determination that the level of the channel access priority class of the data unit is lower than the second threshold level, determine that the set of allowed HARQ processes comprise the original HARQ process only.

10. The first apparatus of claim 1, wherein the first apparatus is caused to transmit the data by:
transmitting the data unit in accordance with a determination that a timer for indicating a validity of the data unit does not expire.

11. The first apparatus of claim 10, wherein the timer is started based on one of the following:
   an initiation of a transmission using the resource associated with the original HARQ process; and
   a generation of the data unit.

12. The first apparatus of claim 1, wherein the target HARQ process is different from the original HARQ process, and wherein the first apparatus is further caused to:
   generate an indicator for a transmission of the data unit using the further resource associated with the target HARQ process, the indicator including an indication of a validity of control information embedded in the data unit; and
   transmit the indicator to the second apparatus.

13. The first apparatus of claim 1, wherein the at least one condition comprises a plurality of conditions, wherein the first apparatus is caused to determine the set of allowed HARQ processes based on the at least one condition by:
   determining a priority of the plurality of conditions; and
   determining the set of allowed HARQ processes based on the priority of the plurality of conditions.

14. A second apparatus, comprising:
   at least one processor; and
   at least one memory including computer program codes;
   the at least one memory and the computer program codes are configured to, with the at least one processor, cause the second apparatus at least to:
   generate at least one condition, to cause a first apparatus to determine a set of allowed Hybrid Automatic Repeat Request, HARQ, processes for transmitting a data unit by the first apparatus, wherein the data unit has not been successfully transmitted using a resource associated with an original HARQ process;
   receive, from the first apparatus, the data unit on a further resource associated with a target HARQ process being selected by the first apparatus from the set of allowed HARQ processes;
   determine a reference value for a timer for indicating a validity of the data unit in the first apparatus; and
   provide the reference value to the first apparatus.

15. The second apparatus of claim 14, wherein at least one condition comprises at least one of:
   at least one threshold level of a logical channel priority, such that the set of allowed HARQ processes is determined based on a comparison between a level of the logical channel priority of the data and the at least one threshold level; or
   a threshold value for at least one characteristic parameter associated with a reference grant configuration, such that the set of allowed HARQ processes is determined based on a comparison between the threshold value and an actual value of the at least one characteristic parameter of a target grant which has been configured for the data unit; or
   an indication of retransmission resources associated with a grant which has been configured for the data unit, such that the set of allowed HARQ processes is determined based on the indication; or
   a threshold data unit queuing time interval, such that the set of allowed HARQ processes is determined based on a comparison between a first time duration that the data unit has been queued and the threshold data unit queuing time interval; or
   a threshold remaining time budget for data delivery, such that the set of allowed HARQ processes is determined based on a comparison between a remaining time interval for delivering the data unit and the threshold remaining time budget for data delivery; or
   a threshold number of attempts for transmitting the data unit, such that the set of allowed HARQ processes comprising at least one candidate HARQ process different from the original HARQ is determined in accordance with a determination that an actual number of attempts for transmitting the data unit exceeds the threshold number of attempts; or
   an indication for determining the set of allowed HARQ processes based on whether the transmission of data unit was scheduled based on a configured grant, such that the set of allowed HARQ processes comprising at least one candidate HARQ process different from the original HARQ is determined in accordance with a determination that the transmission of data unit was scheduled based on the configured grant; or
   at least one threshold level of a channel access priority class, such that the set of allowed HARQ processes is determined based on a comparison between a level of the channel access priority class of the data unit and the at least one threshold level.

16. The second apparatus of claim 15, wherein the threshold number of attempts is zero.

17. The second apparatus of claim 14, wherein the target HARQ process is different from the original HARQ process, and wherein the second apparatus is further caused to:
   receive, from the first apparatus, an indicator for a transmission of the data unit using the further resource associated with the target HARQ process, the indicator including an indication of a validity of control information embedded in the data unit; and
   determine a validity of the control information based on the indicator.

18. A method comprising:
   in accordance with a determination that a data unit is not successfully transmitted using a resource associated with an original Hybrid Automatic Repeat Request, HARQ, process, determining a set of allowed HARQ processes for transmitting the data unit based on at least one condition,
   wherein a first apparatus is caused to determine the set of allowed HARQ processes based on the at least one condition by:
   determining at least one threshold level of a logical channel priority;
   determining a level of a logical channel priority of data in the data unit; and
   determining the set of allowed HARQ processes based on a comparison between the level of the logical channel priority of the data and the at least one threshold level;
   selecting a further resource associated with a target HARQ process from the set of allowed HARQ processes; and
   transmitting the data unit using the further resource to a second apparatus.

* * * * *